US010200608B1

(12) United States Patent
Leizerovich, Jr.

(10) Patent No.: US 10,200,608 B1
(45) Date of Patent: Feb. 5, 2019

(54) PANORAMIC IMAGE PROCESSING SYSTEM, CAMERA, AND METHOD THEREFOR USING MULTIPLE IMAGE PROCESSORS

(71) Applicant: Gustavo D. Leizerovich, Jr., Aventura, FL (US)

(72) Inventor: Gustavo D. Leizerovich, Jr., Aventura, FL (US)

(73) Assignee: 360FLY, INC., Fort Lauderdale, FL (US)

( * ) Notice: Subject to any disclaimer, the term of this patent is extended or adjusted under 35 U.S.C. 154(b) by 81 days.

(21) Appl. No.: 15/218,946

(22) Filed: Jul. 25, 2016

(51) Int. Cl.
*H04N 5/232* (2006.01)

(52) U.S. Cl.
CPC ..... *H04N 5/23238* (2013.01); *H04N 5/23241* (2013.01); *H04N 5/23245* (2013.01); *H04N 5/232411* (2018.08)

(58) Field of Classification Search
None
See application file for complete search history.

(56) References Cited

U.S. PATENT DOCUMENTS

| | | | | |
|---|---|---|---|---|
| 8,988,509 B1* | 3/2015 | Macmillan | ........... | H04N 17/002 348/47 |
| 9,204,041 B1* | 12/2015 | Campbell | .......... | H04N 13/0239 |
| 9,521,398 B1* | 12/2016 | Woodman | .......... | H04N 13/0239 |
| 2005/0053131 A1* | 3/2005 | Domke | ................. | H04N 19/42 375/240.01 |
| 2007/0294458 A1* | 12/2007 | Danilak | .............. | G06F 13/4027 710/313 |
| 2008/0253685 A1* | 10/2008 | Kuranov | ............... | G06T 3/4038 382/284 |
| 2010/0097443 A1* | 4/2010 | Lablans | ................. | G03B 37/00 348/36 |
| 2012/0059720 A1* | 3/2012 | Musabji | ............. | G01C 21/3638 705/14.58 |
| 2012/0113242 A1* | 5/2012 | Crandall | .............. | G02B 21/002 348/79 |
| 2012/0293607 A1* | 11/2012 | Bhogal | ................. | G06T 3/4038 348/36 |
| 2013/0070091 A1* | 3/2013 | Mojaver | .............. | H04N 5/2258 348/143 |
| 2013/0250047 A1* | 9/2013 | Hollinger | ............. | H04N 5/2252 348/36 |
| 2013/0314442 A1* | 11/2013 | Langlotz | ............... | G06T 19/006 345/633 |

(Continued)

*Primary Examiner* — William C Vaughn, Jr.
*Assistant Examiner* — Michael J Hess
(74) *Attorney, Agent, or Firm* — Patents on Demand, Pa; Brian K. Buchheit

(57) ABSTRACT

An image processing system, panoramic camera, and method use multiple image processors to process image data from an image sensor to provide a panoramic image output of different resolutions depending on a mode of operation. None of the image processors are capable of outputting an image at a full resolution of the image sensor's output image data. Depending on the mode of operation, each image processor can process a portion of the image data output by the image sensor to produce a respective image that may be joined with the image(s) produced by the other processor(s) to create a full resolution image, or a less than a full resolution image can be produced by turning off one or more of the image processors.

19 Claims, 7 Drawing Sheets

(56) References Cited

U.S. PATENT DOCUMENTS

| | | | |
|---|---|---|---|
| 2014/0270684 A1* | 9/2014 | Jayaram | H04N 5/23238 386/224 |
| 2014/0281603 A1* | 9/2014 | Boucher | G06F 1/3206 713/320 |
| 2015/0271483 A1* | 9/2015 | Sun | H04N 17/002 348/187 |
| 2015/0379675 A1* | 12/2015 | Yonemoto | G06T 1/20 382/307 |

* cited by examiner

PANORAMIC IMAGE PROCESSING SYSTEM, CAMERA, AND METHOD THEREFOR USING MULTIPLE IMAGE PROCESSORS

FIELD OF THE DISCLOSURE

The present disclosure relates generally to digital camera image processing and, more particularly, to panoramic image processing in various resolutions.

BACKGROUND

Panoramic cameras have been in use for many years, and have long been used in conventional camera systems using film. A panoramic camera is conventionally defined as a camera that produces an image that is at least twice as wide as its height. Less formally, a panoramic image can be thought of as an image of a panoramic view, which would require a normal person to pan their gaze (i.e., turn their head) across the view in order to see all of it.

In conventional photography, a panoramic view requires complex and heavy optics in the lenses to correct warping and other optical aberrations before the light is incident on the film. However, in digital cameras, where light is incident on a semiconductor or solid state image sensor to produce image data, optical aberrations can be corrected by image processing techniques, obviating the need for complex and often heavy optical lensing systems. Using image processing techniques, for example, the image produced by a fisheye lens, as incident on an image sensor, can be "unwarped" to produce a conventional-appearing image without the appearance of fisheye warping in the processed image. In other applications, multiple images of adjacent views can be "stitched" together to produce a larger image that is continuous across the image, without substantial aberration as would be the case by simply arranging the individual images to be merely adjacent each other.

In still image processing, processing time, while an important consideration, is not as critical as in video. Video processing requires outputting successive image data in frames at a rate necessary to facilitate the perception of motion when viewed by a person. Processing panoramic video will obviously require more processing resources to output the same frame rate as a non-panoramic video. As a result, image processors for panoramic video can be more expensive, and consume much more power than a conventional image processor. Likewise, a larger panoramic view requires more processing than a smaller panoramic view. Today, so-called 360 degree panoramic video is becoming more popular, with a number of 360 degree camera devices available for sale. These cameras produce panoramic video that is also navigable, meaning the viewer can shift view orientation around the video image in real time as the video is played. However, given that panoramic cameras are quickly being adopted in the consumer market, there is a desire to increase the options available to users, as well as a desire to reduce the cost of producing such devices.

BRIEF DESCRIPTION OF THE DRAWINGS

In the accompanying figures like reference numerals refer to identical or functionally similar elements throughout the separate views, together with the detailed description below, and are incorporated in and form part of the specification to further illustrate embodiments of concepts that include the claimed invention and explain various principles and advantages of those embodiments.

Figure 1:
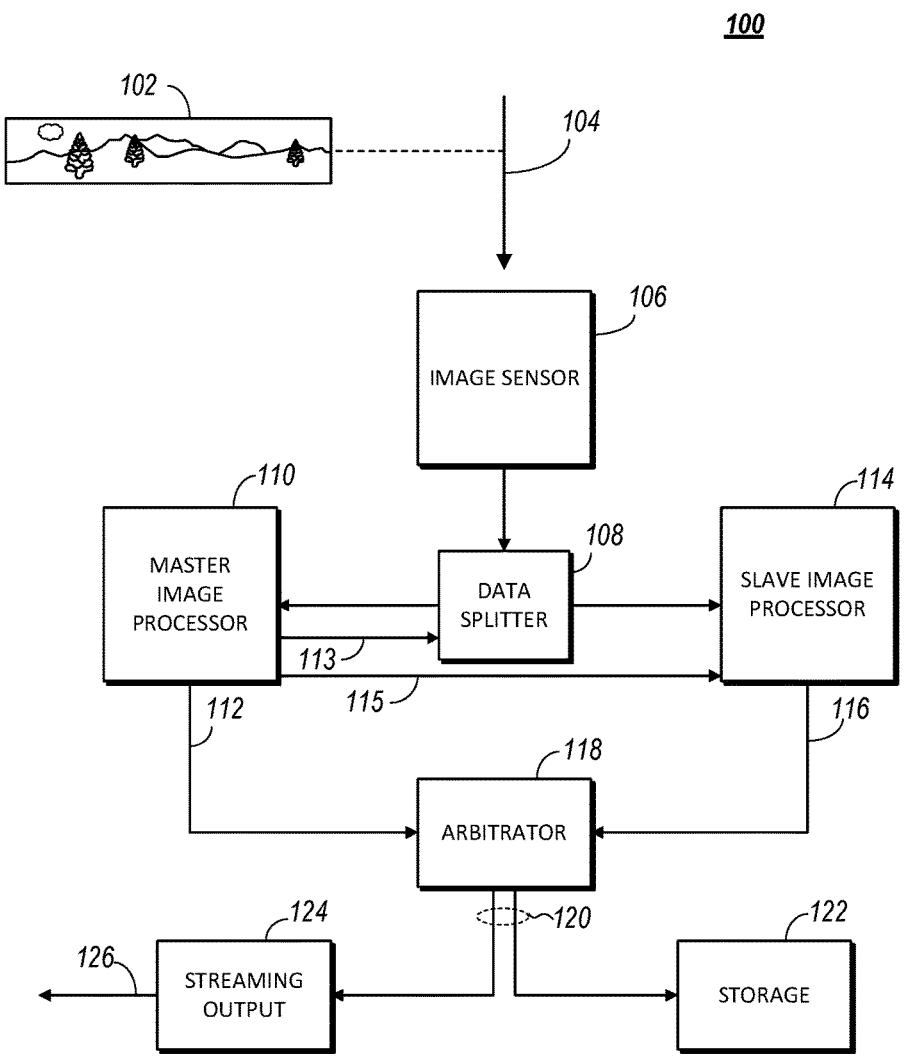
FIG. 1 is a block schematic diagram of an imaging system for a panoramic camera, in accordance with an exemplary embodiment of the present disclosure.

Those skilled in the field of the present disclosure will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. The details of well-known elements, structure, or processes that would be necessary to practice the embodiments, and that would be well known to those of skill in the art, are not necessarily shown and should be assumed to be present unless otherwise indicated.

DETAILED DESCRIPTION

Embodiments of the inventive teachings herein solve the problems associated with the prior art by splitting the image processing tasks among multiple or all available image processors when full image resolution output is desired, and scaling the image processing down to fewer than all image processors, or to one image processor, when lower resolution output is desired. Embodiments taught herein include a panoramic image processing system that includes an image sensor which produces raw image data based on light incident on the image sensor from a panoramic view. The image processing system can further include a controllable data splitting circuit that is operable to either direct the raw image data produced by the image sensor to a first output or split the image data between the first output and a second output. A master image processor is coupled to the first output of the controllable data splitting circuit and provides a first raster output. A slave image processor is coupled to the second output of the controllable data splitting circuit and provides a second raster output. The image processing system can further include a memory arbitration circuit that arbitrates the first raster output and the second raster output to produce an image frame and stores the image frame in a memory file.

FIG. 1 is a block schematic diagram of an imaging system 100 for a panoramic camera, in accordance with some embodiments. A panoramic camera captures light from a panoramic view 102, which in photography is typically defined as viewing field that is at least twice as wide as it is high. More generally, a panoramic view can be defined as a view that requires a person to look in different directions (i.e., to pan their view) to see across the entire view. Light 104 from the panoramic view 102 is gathered and focused onto a semiconductor image sensor 106. Because the light 104 is gathered from a panoramic view, it is incident on the image sensor 106 in a non-rectangular format since the light is gathered from a wide angle around the device in which the imaging system 100 is disposed, which is collimated to direct the light onto the image sensor 106. Accordingly, in order to form an image which can be viewed by a person, image processing is required to transform and map the panoramic image as incident on the image sensor 106 to a conventional viewing format for human perception.

There are a great many image processors available for conventional (i.e., non-panoramic) image processing. However, simply scaling such image processors to process more image information (i.e., pixels) may not be suitable for many applications. For example, modified processors may be disproportionately expensive and, without increasing the rate at which image information can be processed, the additional image information will result in longer processing time. Additionally, a user may not always desire a full panoramic view in the output image or video (which is essentially a series of images).

To solve these problems, image data generated by the image sensor 106 can be selectively split by a data splitter 108 among a master image processor 110 and a slave image processor 114. The master image processor 110 has a first image output 112 that will be in the form of a formatted image (e.g., a raster output), and the slave image processor 114 has a second image output 116 that is likewise a formatted image output. Each of the master and slave image processors 110, 114 produce a maximum output resolution (pixels) that is smaller than the maximum resolution of the image sensor. For example, each of the master and slave image processors can be capable of outputting half the resolution of the image sensor. Thus, for example, each can produce an output having a width that is half the number of pixels capable of being resolved by the image sensor 106, and a height that is equal to the number of pixels produced by the image sensor 106. This resolution mapping takes into account any transform that must be applied to the image data to obtain a rectangular equivalent, such as a circular to rectangular transform or mapping.

Both the first and second image outputs 112, 116 can be provided to an arbitrator 118. The data splitter 108 is controllable by the master image processor 110 (e.g., by line 113) or by other processing functionality of the imaging system 100, and can selectively direct either all of the image data to the master image processor 110 or one portion of the image data to the master image processor 110 and another portion of the image data to the slave image processor 114.

The master image processor 110 is not able to produce a full width and full height raster output of the image data, but it can output a full width and partial height raster output, or a partial width and full height raster output. The width and height of the image produced by the image sensor 106 are defined by the dimensions of the image sensor 106, and the processing necessary to transform the image data into a substantially rectangular or rectangularly-formatted output. So, for example, if the maximum width resolution capable of being produced by the image sensor 106 is 7680 pixels, then a partial width raster will have a width smaller than 7680 pixels. The slave image processor 114 can, in some embodiments, be capable of only producing a partial width and full height raster output, where the partial width is complementary to the partial width output of the master image processor 110 for the full width available. The arbitrator circuit 118 receives both the first image output 112 and the second image output 116 in at least some modes of operation of the image system 100, and can combine the partial width and full height raster output of the master and slave image processors 110, 114 to produce a full width and full height raster output 120. The output 120 of the arbitrator 118 is a raster of a selected width and height, based on the mode of operation of the imaging system 100, and can be, for example, stored in a memory 122 or provided to an output, such as a streaming output 124 for streaming video 126. The master image processor 110 can control operation of the slave image processor 114 (e.g., via line 115) to operate in synchronization with the master image processor 110, so that when the outputs 112, 116 of the master and slave processors 110, 114 are combined by the arbitrator 118, they depict the same moment of time and any motion is continuous across the resulting output 120 of the arbitrator 118.

Figure 2:
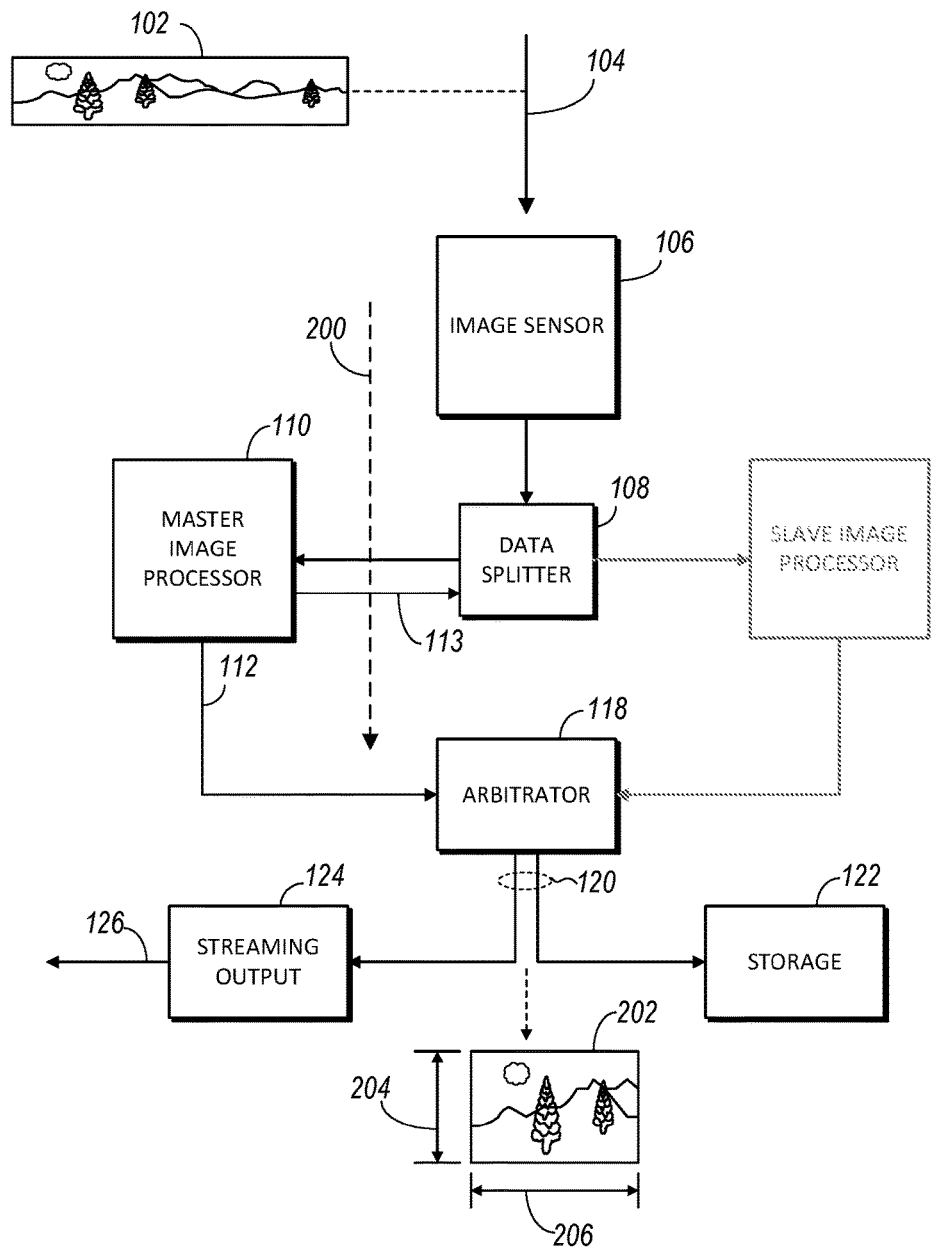
FIG. 2 is a block schematic diagram of the imaging system of FIG. 1 as illustrating an exemplary first mode of operation for the system.
Figure 3:
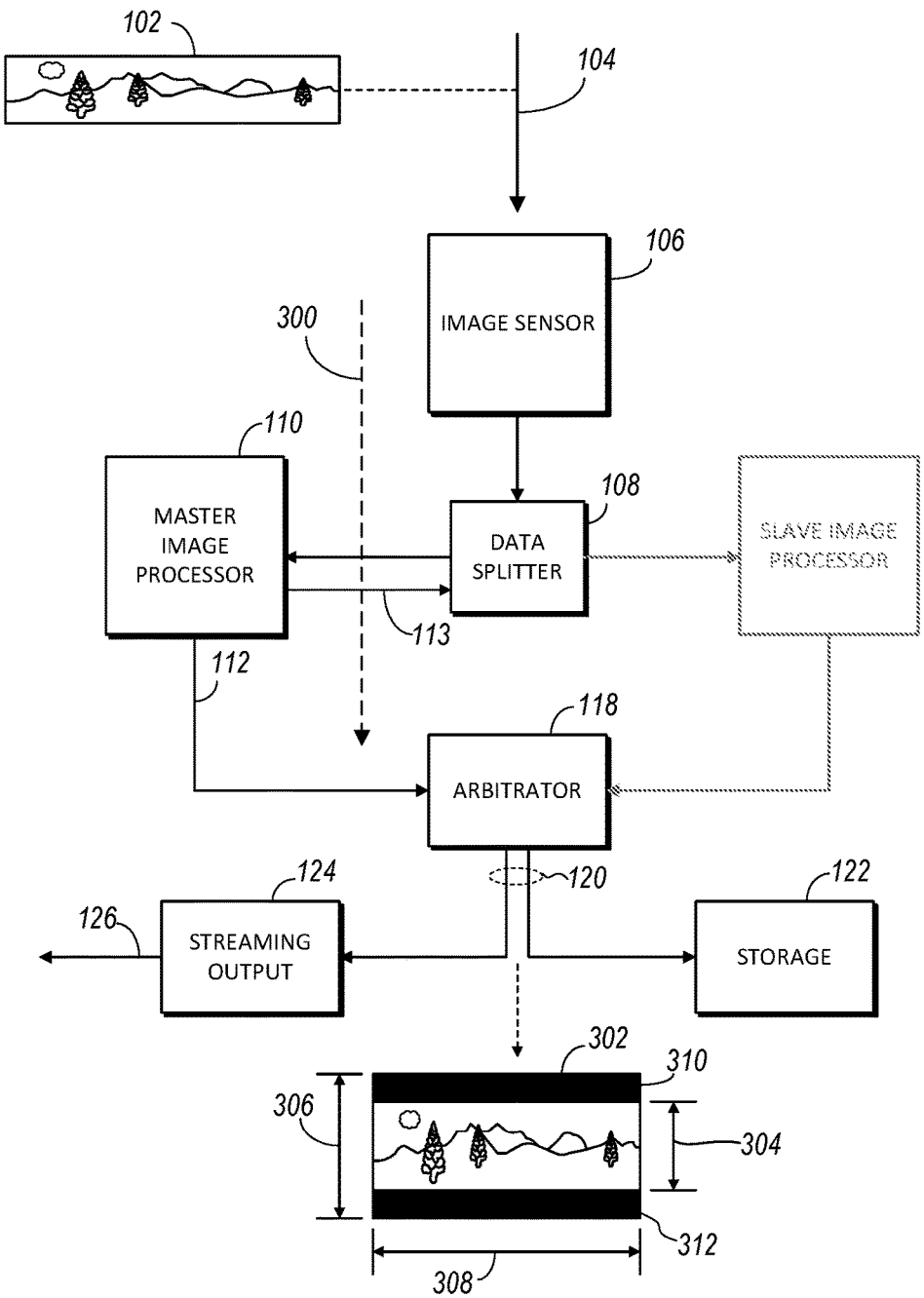
FIG. 3 is a block schematic diagram of the imaging system of FIG. 1 as illustrating an exemplary second mode of operation for the system.
Figure 4:
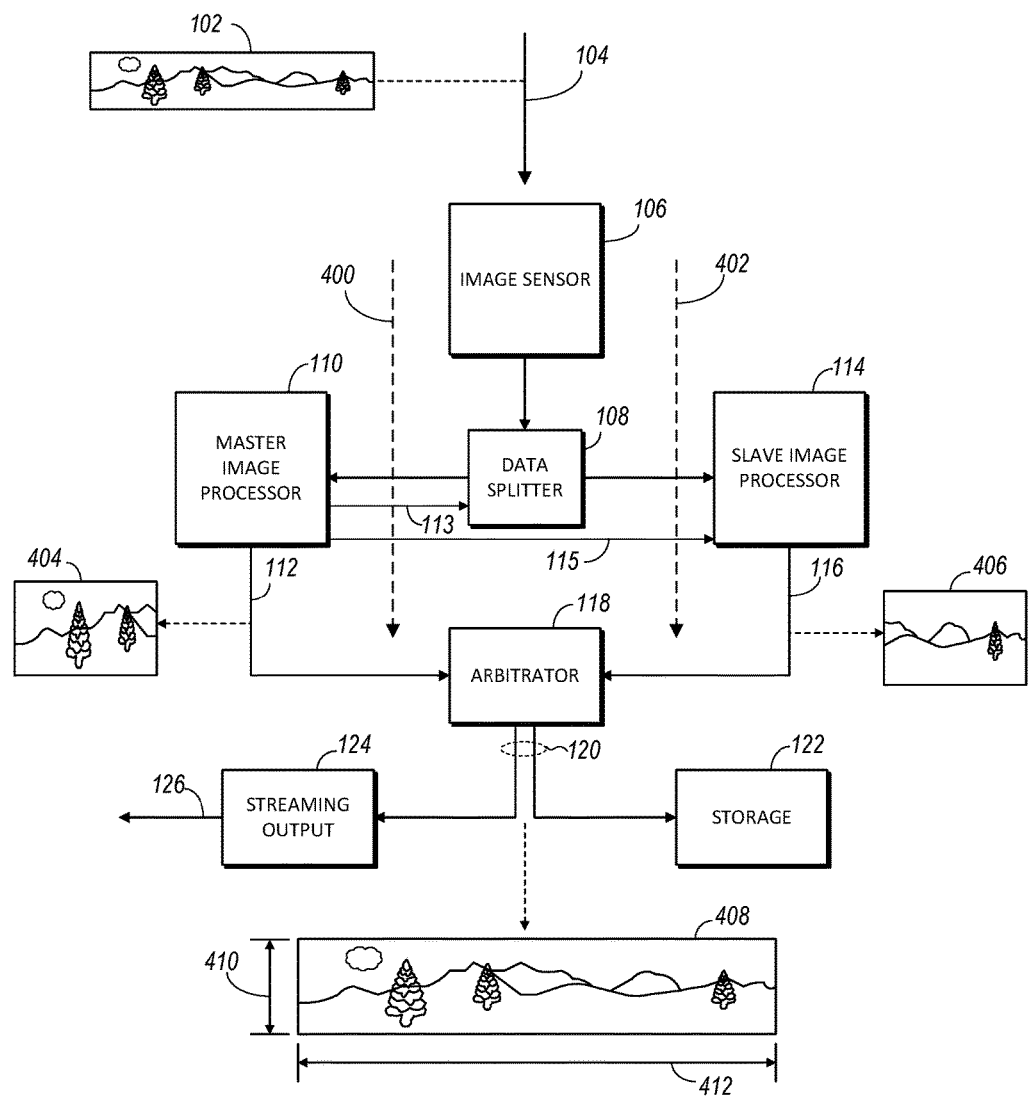
FIG. 4 is a block schematic diagram of the imaging system of FIG. 1 as illustrating an exemplary third mode of operation for the system.

The operation of the imaging system 100 can occur in one of several modes, which can, for example, be selected by a user, be the result of a default setting, or be in response to other conditions, such as battery charge level. In general, the slave image processor 114 is enabled only when the desired resolution of the output image 120 is greater than the resolution output capability of the master image processor 110 alone. FIGS. 2-4 provide several examples of various possible modes of operation of the imaging system 100.

FIG. 2 is a block schematic diagram of an imaging system for a panoramic camera, and illustrating a first mode of operation, in accordance with some embodiments. The imaging system of FIG. 2 is the same as the imaging system 100 of FIG. 1, except that the imaging system of FIG. 2 uses only the master image processor 110, as indicated by line 200. In this first exemplary mode of operation, light 104 from the panoramic view 102 is gathered and focused on the image sensor 106. The image sensor produces image data that is provided to the master image processor 110 through the controllable data splitter 108. The master image processor can control the data splitter 108 via a signal on line 113 to connect the master image processor 110 to the image sensor 106 such that the image data necessary to produce the desired raster is provided to the master image processor 110. In this first exemplary mode the output image is formatted as a partial width and full height raster. Accordingly, an output image 202 has a height 204 which is a maximum height that can be produced by the image sensor 106. The output image 202 has a partial width 206 that is less than the full image width resolution that can be produced directly by the image sensor 106. For example, if the full resolution capability of the image sensor 106 is 7680×2160 pixels (width×height), image output 202 can be 3840×2160. Thus, in the first exemplary mode of operation the imaging system can output images or video in a 3840×2160 format, which is substantially half of the full width produced by the image sensor 106. Therefore, if the panoramic image 102 is a three hundred sixty degree panoramic image, then image output 202 represents a one hundred eighty degree portion of the panoramic image 102. As suggested here the output image 202 is substantially the left half of the panoramic image 102, and in some embodiments the user can select a portion of the panoramic image 102 which is centered anywhere in the panoramic image 102 rather than being only a left half portion.

FIG. 3 is a block schematic diagram of an imaging system for a panoramic camera, and illustrating a second mode of operation, in accordance with some embodiments. As with FIG. 2, only the master image processor 110 is used in this second exemplary mode of operation as indicated by arrow 300. An output image 302 uses maps the full width of the panoramic image into the maximum width 308 capable by the master image processor, which is less that the full number of pixels produced across the width of the image data by the image sensor 106. The height 304 is scaled accordingly, and is reduced from the full height 306. Bars 310, 312 can be added to fill in the image field. In order to produce the output image 302 such that the full width of the panoramic view 102 is depicted in the output image 302, the master image processor can simply process every other column of pixels as mapped from the image data to a rectangular form. So, for example, if the image sensor 106 produces sufficient image data to support a full width of 7680 pixels, the master processor selects pixel columns or other pixel patterns to depict the full panoramic image 102 in half of the full resolution, which would be 3840 pixels. Thus width 308 is still 3840 pixels across, in keeping with the example. The partial height 304 is then 1080 pixels of the full 2160 pixels.

FIG. 4 is a block schematic diagram of an imaging system for a panoramic camera, and illustrating a third mode of operation, in accordance with some embodiments. In this third exemplary mode of operation, both the master image processor 110 and the slave image processor 114 are used to produce a portion of the output image 408, as indicated by lines 400, 402, respectively. In this example, each of the master and slave image processors 110, 114 process half of the image data of the image sensor 106. Thus, the master image processor 110 produces a first half 404, and the slave image processor 114 produces the second half 406. The arbitrator 118 joins the halves 404, 406 to produce image output 408, which has the full width 412 and full height 410 of the panoramic view at the maximum resolution of the image data. Thus, the master image processor 110 operates substantially the same as in FIG. 2, but in this embodiment, the master image processor 110 enables the slave image processor 114 to provide the other half of the output image 408 by processing the portion of the image data that is complementary to the portion of the image data processed by the master processor 110. In order to ensure that the two output image halves 404, 406 are truly complementary to one another, the master image processor 110 can control the slave image processor 114 to synchronize its reading of image data with that of the master image processor 110. Furthermore, the master image processor 110 can indicate image parameters, such as intensity, to be used by the slave image processor 114 so that the full output image 408 is visually contiguous across the border where the two output image halves 404, 406 meet in the full image, so that the viewer cannot detect a difference.

Thus, in general, each of the image processors 110, 114 are only capable of outputting an image or image portion at a resolution that is less than the full resolution of the image data, but which when combined together add up to the full image resolution of the image data. The modes of FIGS. 2-3 can be used, for example, to conserve battery power in applications where the image processing system 100 is powered by a battery. A user can select to see a portion of the full panoramic view in full resolution (for that portion), such as shown in FIG. 2, or to see a scaled version of the full panoramic view at a lower resolution, such as shown in FIG. 3. Thus, by shutting off the slave image processor 114 for the modes of operation represented by FIGS. 2 and 3, essentially half of the image processing power consumption is shut off, and the slave image processor 114 can be kept in an off or very low power consumption state, while the master image processor 110 handles image processing. Alternatively, the viewer or user can select an operating mode represented by FIG. 4, where the output of each of the image processors 110, 114 are combined to produce an image at the full resolution of the image data, where each of the image processors 110, 114 are capable of outputting half (or some other portion) of the full resolution of the image data such that combining the outputs of the image processors 110, 114 results in an image at the full resolution of the image data. Furthermore, the image processors 110, 114 can be less expensive in total compared to using a single image processor capable of outputting the full image resolution of the image data.

Figure 5:
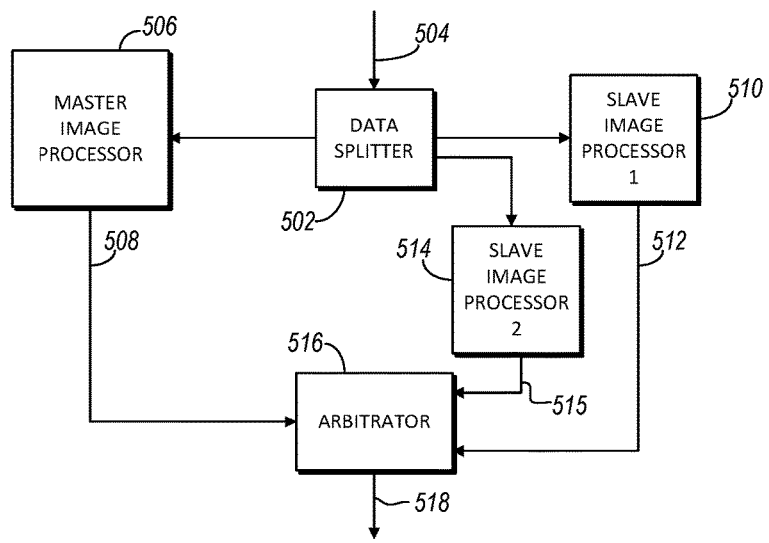
FIG. 5 shows an image processing system in which multiple slave image processors can be used, in accordance with an alternative exemplary embodiment of the present disclosure.

FIG. 5 shows an image processing system 500 in which multiple slave image processors can be used, in accordance with further exemplary embodiments. Image data 504 output from the image sensor 106 is passed through a data splitter 502 and fed to one or more image processors, including a master image processor 506 and two or more slave image processors, such as a first slave image processor 510 and a second slave image processor 514. The master image processor 506 outputs a first image output 508, while the first and second slave image processors 510, 514 output second and third image outputs 512, 515, respectively. The first, second, and third image outputs 508, 512, 515 are provided to an arbitrator 516, which can combine the images produced by the image processors 506, 510, 514. The image data 504 provided by the image sensor 106 has a resolution that exceeds the maximum output resolution of any of the individual image processors 506, 510, 514. Hence, each image processor 506, 510, 514 can produce an image that represents a portion of a full image that can be produced from the image data 504, such that the arbitrator 516 can arrange these image portions (i.e., the first, second, and third image outputs 508, 512, 515) to produce a full image output 518.

Alternatively, the master image processor 506 can shut off one or more of the slave image processors 510, 514. For example, the master image processor 506 can output a full resolution raster of a subsection of the image data 504, where the subsection is selected to correspond to the resolution output capability of the master image processor 506. For example, if the full resolution of the image data 504 output by the image sensor 106 is 7680 by 2160 pixels and the master image processor 506 has an output resolution of 2560 (width) by 2160 (height) pixels, the master image processor 504 can select a 2560 by 2160 section of the image data 504 and produce a 2560 by 2160 raster output as the first image output 508. In this example, the arbitrator 516 can output the first image output 508 as its output 518, or it can combine the first image output 508 with one or more of the second image output 512 and the third image output 515 to produce, for example, a 5120 by 2160 image output (formed by joining two image raster outputs of 2560 by 2160 each).

In another example, the full image data 504 can be scaled to fit in the width of one or two of the image processors 506, 510, 514. If the full image data 504 is scaled to fit in the width of only the master image processor 506, then it will produce a raster output having a resolution of 2560 by 720 pixels. In such an example, a 720 pixel high section above and below the 2560 by 720 raster can be filled with black (or some other color or pattern) to fill in the remaining portion of the 2560 by 2160 output 508 of the master processor 506. To achieve this ⅓ downscaling, the master image processor 506 can, for example, simply use a subsection of the image data 504 by selecting pixels at the intersections of the equivalent of every third column and every third row of pixels when the full image data 504 is transformed into a rectangular format. Similarly, the full resolution of the image data 504 can be scaled down by a ⅔ factor by scaling the full image of the image data 504 into a 5120 by 2160 format made up of the 2560 by 2160 output of the master image processor 506 being joined with the 2560 by 2160 output of one of the slave processors 510, 514.

The imaging system 500 of FIG. 5 illustrates the scalability of the inventive concepts disclosed herein. Those skilled in the art will appreciate that various configuration of image processors can be arranged to process different portions of the available image data to operate cooperatively in producing an image output of the imaging system 500. Thus, in the appended claims, where "a" slave image processor is recited, it will be understood to be at least one slave image processor.

Figure 6:
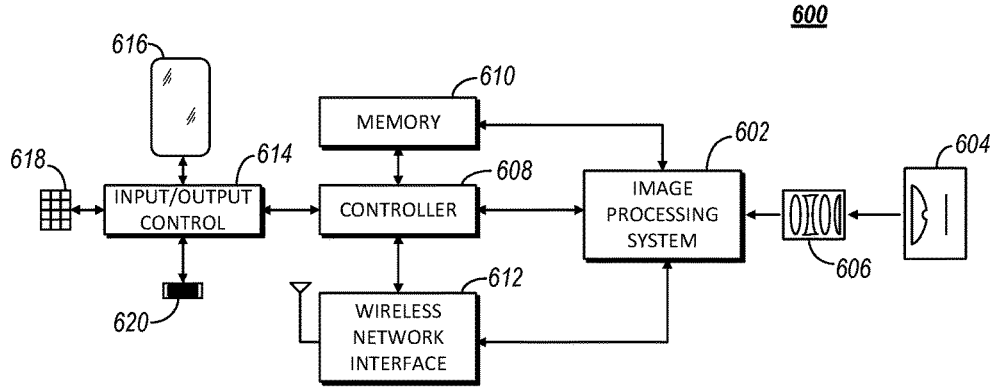
FIG. 6 is a block schematic diagram of a panoramic camera having an image processing system, in accordance with another exemplary embodiment of the present disclosure.

FIG. 6 is a block schematic diagram of a panoramic camera 600 having an image processing system 602, in accordance with some embodiments. Light from a panoramic view can be gathered by a light gathering system 604, which directs light through a lens system 606 to focus the gathered light onto the image sensor of the image processing system 602 The image processing system 602 can be configured and operate in a manner as illustrated in FIGS. 1-5. The light gathering system 604 can include one or more reflector elements, fish eye lenses, or other such components for gathering light from a panoramic view. Operation of the camera 600 can be carried out by a controller 608, which is a microcontroller or microprocessor. The controller 608 performs instruction code which can be stored and instantiated in memory 610. Memory 610 can represent an aggregate memory of different memory types that can be accessed by the controller, and can include both storage memory and operating or execution memory, such as read only memory (ROM) and/or random access memory (RAM). The camera 600 can include a wireless network interface 612 that operates according to any one or more of several known wireless networking protocols, such as those specified by the Institute of Electrical and Electronic Engineers (IEEE) in the specifications 802.11 and 802.15. The wireless network interface 612 allows the camera 600 to transmit and receive data from other devices, and to stream video from the camera 600 as produced by the image processing system 602 to other devices for storage and/or viewing on such other devices. The camera 600 can include several forms of input and output control 614 to control interface elements, such as a graphical display 616, buttons or other tactile input and selection components 618, and data busses, such as a universal serial bus (USB) connection 620. The graphical display 616 and buttons 618 can operate cooperatively to present information to, and receive input from, a user. The USB connection 620 can be used to access information in the memory 610, such as stored image data produced by the image processing system 602.

Figure 7:
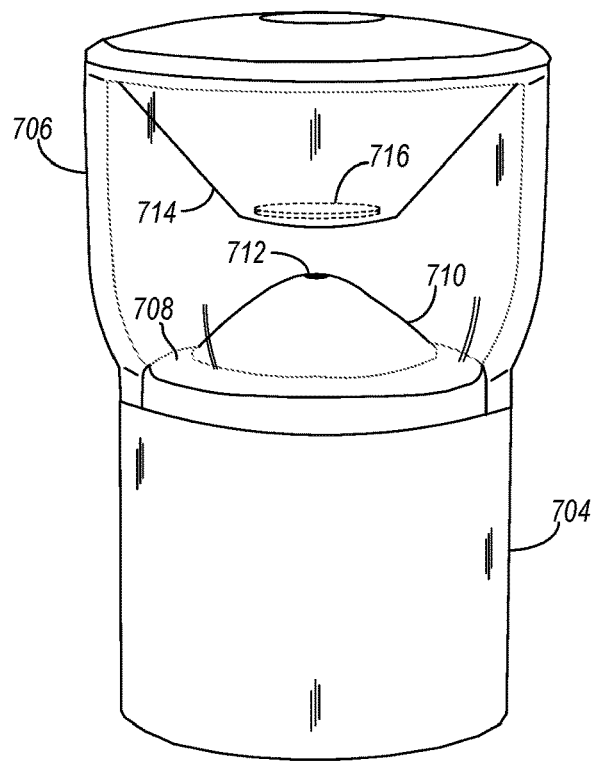
FIG. 7 shows a side perspective view of a panoramic camera, and a top plan view of a reflector portion of the panoramic camera, in accordance with a further exemplary embodiment of the present disclosure.
Figure 7:
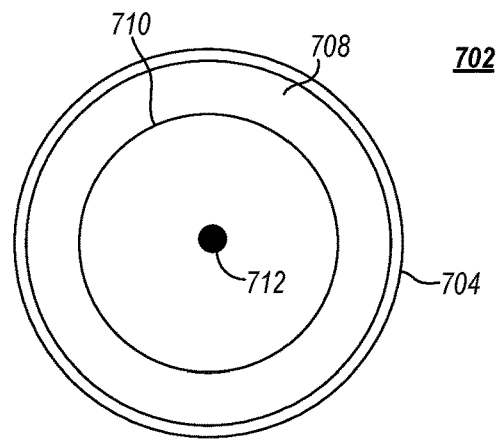

FIG. 7 shows a side perspective view 700 of a panoramic camera, and a top plan view 702 of the reflector portion of the panoramic camera, in accordance with one exemplary embodiment. The embodiment shown in FIG. 7 is merely one form of a panoramic camera implementation, and those skilled in the art will appreciate that other forms exist, such as those that use a fish-eye lens system as the primary panoramic light gathering and focusing system, which can utilize the inventive concepts taught herein as well. The panoramic camera can capture a three hundred sixty degree panoramic view, and includes a base 704 which supports an outer lens 706, and a portion of a reflector system that includes an annular quadric reflector 710 that sits on a top portion 708 of the base 704. The quadric reflector 710 is generally a domed shaped reflector that reflects light from all around the panoramic camera up to a flat reflector 716 mounted in an inverted conical light blocker 714. The flat reflector 716 is mounted and centered over an opening 712 in the top of quadric reflector 710. Light reflecting from the quadric reflector 710 up to the flat reflector 716 is further reflected down into the opening 712, into a lens column (not shown) where the light is focused onto an image sensor. The base 704 contains the image sensor and other electrical and electronic components of the panoramic camera.

Figure 8:
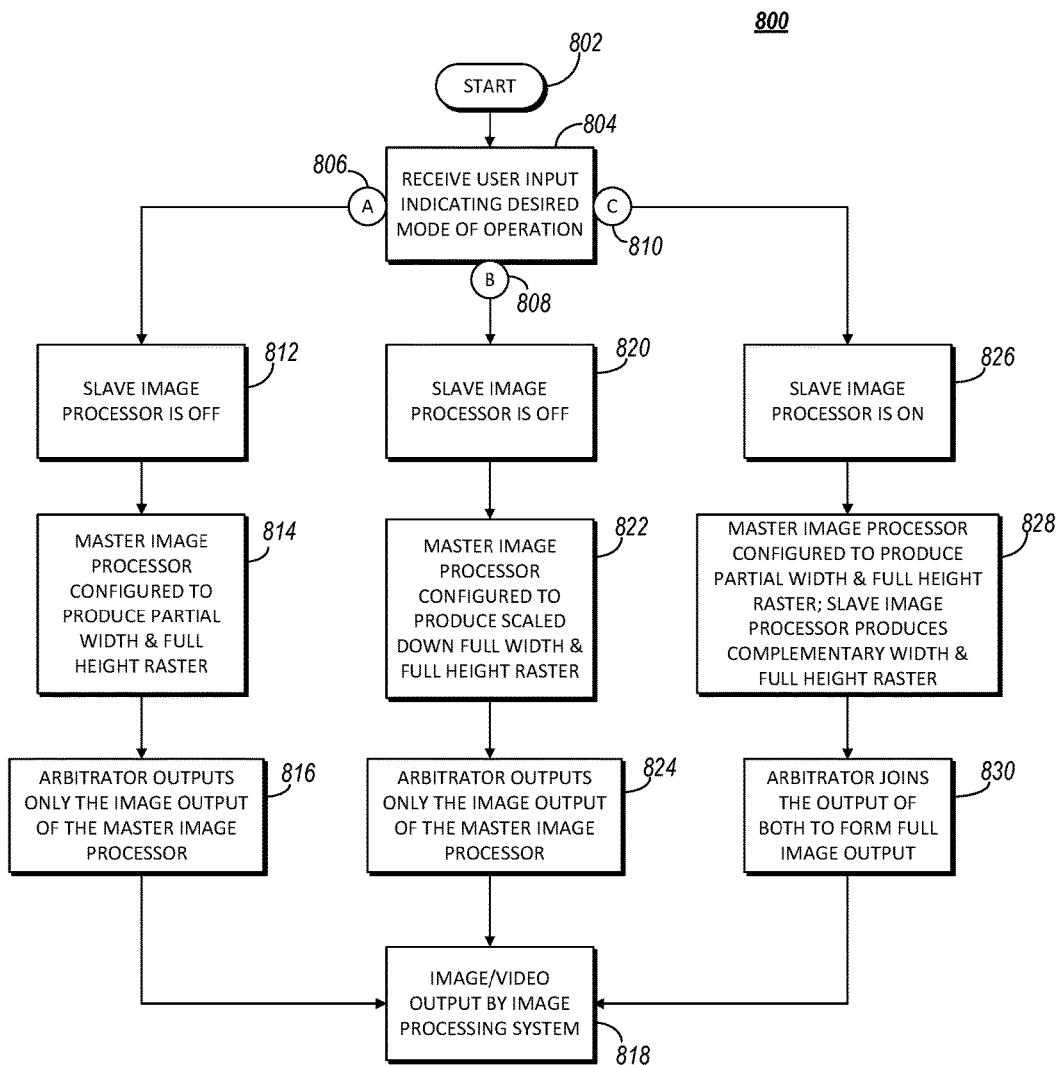
FIG. 8 is a flow chart diagram illustrating methods of operating a panoramic camera and image processing system, in accordance with several exemplary embodiments of the present disclosure.

FIG. 8 is a flow chart diagram 800 of methods for operating a panoramic camera and image processing system, in accordance with some embodiments. At the start 802, the image processing system and panoramic camera are generally powered up and ready for operation. The image processing system includes an image sensor that produces image data in response to light that is gathered and focused on the image sensor. To process the image data, the image processing system includes a master image processor and at least one slave image processor operated under control of the master image processor. Both the master image processor and the slave image processor are capable of rendering image data, but do not have the ability to process all the image data of the full panoramic view. That is, the master image processor and the slave image processor each have a maximum resolution that is less than the full resolution of the image data for the panoramic view. However, the master image processor and the slave image processor can, together, process all of the full image data by each processing a portion of the full image data and having their outputs e joined to produce a full panoramic image at the full resolution of the image data produced by the image sensor. Alternatively, the image processing system can, using only the master image processor, output an image at less than the full resolution of the image data produced by the image sensor, or the full image data can be scaled down to fit in the lower resolution capability of the master image processor.

Accordingly, in step 804, the panoramic camera is operated by a user to provide an output image setting that indicates the desired mode of operation. In the present example, there are three modes of operation corresponding to the three different branches, A 806, B 808, and C 810. If the first mode of operation (Mode A 806) is selected, the method proceeds to step 812, where the slave image processor is turned off or otherwise placed in a low power state since it is not used. In step 814, the master image processor processes a portion of the full image data, which corresponds to the maximum output resolution capability of the master image processor. For example, if the full image data has a resolution of 7680 by 2160 pixels and the master image processor can produce a maximum output resolution of 3840 by 2160 pixels, which is half of the full image data, the master image processor takes a 3840 by 2160 section of the full image data (which may be selected by the user) and produces an image output at 3840 by 2160 resolution (i.e., a raster). In this case, the arbitrator only outputs the output of the master image processor in step 816, which is output by the image processing system in step 818 as either images or video.

Similarly, in step 804, if the second mode of operation (Mode B 808) is selected, then in step 820 the slave image processor is shut off or set into a low power state. In this mode, the full image data is scaled down to fit into the maximum width of the master image processor in step 822. Thus, for example, if the full image data output by the image sensor has a resolution of 7680 by 2160 and the master image processor is capable of outputting an image at a resolution of 3840 by 2160, then an image of 3840 by 1080 is produced by the master image processor. The remaining half of the height (2160 pixels) can be filled with black (or any other color or fixed pattern). Thus, in step 824, the arbitrator only outputs the output of the master image processor without modification.

If a full image output is desired, then the third mode of operation (Mode C 810) is selected in step 804. In step 826, the slave image processor is then turned on. The slave image processor generally has a resolution that is a complement to the resolution of the master image processor for a total maximum resolution. For the present example, however, assume the slave image processor has a resolution that is equal to the resolution of the master image processor. In step 828, both the master and slave image processors are each configured to output a full height and partial width image resolution image that, when combined or joined together, form a full panoramic image output. For example, each of the master and slave image processors can be configured to output a 3840 by 2160 pixel raster from raw image data of 7680 by 2160 pixels as output by the image sensor, with each image processor processing a respective half of the raw image data. The slave image processor can be controlled to be in synchronization with the master image processor in time and in image processing parameters so that, in step 830, when the respective outputs of the master and slave image processors are joined together by the arbitrator, there is no visible border in the middle of the resulting full resolution image raster. The arbitrator sends the full resolution image to the appropriate output system in step 818, whereupon the method 800 can end or repeat the selected path 806, 808, or 810 for another image frame.

As detailed above, the inventive embodiments of the present disclosure provide the benefit of using inexpensive image processors to achieve a full resolution panoramic image. By splitting the processing between two or more image processors having a lower image processing resolution than the full image resolution output of the image sensor, the necessary image processing capability of each image processor is greatly reduced. In many instances, the sum of the costs of the plurality of image processor is less than the cost of a single image processor capable of processing a full panoramic image. A secondary benefit is then realized by allowing a user to select an image resolution output that requires less than all of the image processors to be turned on, thereby conserving energy use from a battery in battery powered cameras.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description as part of the original disclosure, and remain so even if cancelled from the claims during prosecution of the application, with each claim standing on its own as a separately claimed subject matter. Furthermore, subject matter not shown should not be assumed to be necessarily present, and that in some instances it may become necessary to define the claims by use of negative limitations, which are supported herein by merely not showing the subject matter disclaimed in such negative limitations.

What is claimed is:

1. A panoramic image processing system, comprising:
   an image sensor that produces image data based on light incident on the image sensor from a panoramic view;
   a controllable data splitting circuit that is operable to either direct the image data produced by the image sensor to a first output or split the image data between the first output and a second output;
   a master image processor, coupled to the first output of the controllable data splitting circuit, that provides a first raster output and controls the controllable data splitting circuit;
   a slave image processor, coupled to the second output of the controllable data splitting circuit and operating under control of the master image processor, that provides a second raster output; and
   a memory arbitration circuit that arbitrates the first raster output and the second raster output to produce an image frame and stores the image frame in a memory file, wherein the master image processor activates the slave image processor and instructs the controllable data splitting circuit to split the image data between the first output and the second output only when a resolution of the image frame is to be greater than a resolution output capability of the master image processor.

2. The panoramic image processing system of claim 1, wherein the master image processor selectively outputs either a full width and partial height raster or a partial width and full height raster, and wherein the partial width is a subsection of the full width.

3. The panoramic image processing system of claim 2, wherein the full width represents a 360 degree panoramic view and wherein the partial width represents a 180 degree panoramic view.

4. The panoramic image processing system of claim 2, wherein the subsection of the full width that makes up the partial width of the first raster output is selected by user input.

5. The panoramic image processing system of claim 2, wherein when the master image processor outputs the full width and partial height raster, the master image processor fills in a remaining portion of the full height with a preselected background.

6. The panoramic image processing system of claim 1, wherein the image processing system is disposed in a battery powered portable camera device, and wherein control of the controllable data splitting circuit takes into account battery energy conservation by using the master image processor in a mode of operation to handle image processing for the image data and keeping the slave image processor in an off or very low power consumption state.

7. The panoramic image processing system of claim 1, wherein the master image processor selectively activates the slave image processor to provide a complementary image raster as the second raster output, and wherein the complementary image raster is joined with the first raster output by the memory arbitration circuit to create a full image frame.

8. The panoramic image processing system of claim 7, wherein the master image processor further synchronizes image capture times with the slave image processor so that the master image processor and the slave image processor each read the image sensor in synchronization.

9. The panoramic image processing system of claim 8, wherein the master image processor further indicates a baseline image level to be used by the slave image processor and wherein the second raster output produced by the slave image processor matches the first raster output, such that when the first raster output and second raster output are joined there is image continuity across the image frame.

10. A method for processing image data generated by an image sensor from a panoramic view, the method comprising:
    producing image data at an image sensor based on light incident on the image sensor from a panoramic view;
    determining whether to split the image data between a master image processor and a slave image processor or to provide all the image data to the master image processor only;
    when all of the image data is provided to the master image processor, processing, by the master image processor, the image data so as to output a full width and partial height raster or a partial width and full height raster of the image data;
    when the image data is split between the master image processor and the slave image processor,
    processing, by the master image processor, a first portion of the image data to output a first partial width and full height raster;
    processing, by the slave image processor, a second portion of the image data to output a second partial width and full height raster, wherein the second partial width and full height raster is complementary to the first partial width and full height raster; and
    joining the output of the master image processor with the output of the slave image processor to produce a full image frame that is a full width and full height raster, wherein determining whether to split the image data between the master image processor and the slave image processor or to provide all the image data to the master image processor only comprises:

determining to split the image data between the master image processor and the slave image processor only when a resolution of the full image frame is to be greater than a resolution output capability of the master image processor.

11. The method of claim 10, further comprising:

when the image data is split between the master image processor and the slave image processor, controlling, by the master image processor, the slave image processor to read the image sensor in synchronization with the master image processor.

12. The method of claim 10, further comprising:

when the image data is split between the master image processor and the slave image processor, controlling, by the master image processor, the slave image processor to produce the second partial width and full height raster at an image level that is based on the first partial width and full height raster output by the master image processor, such that the full image frame is continuous at a border where the output of the master image processor and the output of the slave image processor are joined.

13. The method of claim 10, wherein a device processing image data is battery powered, the method further comprising:

when all of the image data is provided to the master image processor, keeping the slave image processor in an off or very low power consumption state to conserve battery power.

14. The method of claim 10, wherein when all of the image data is provided to the master image processor, the master image processor processes the image data so as to output a full width and partial height raster of the image data when a resolution of an output image frame is to be less than or equal to a resolution output capability of the master image processor, and the master image processor processes the image data so as to output a partial width and full height raster of the image data when a resolution of the output image frame is to be greater than a resolution output capability of the master image processor.

15. A panoramic camera, comprising:

a panoramic light gathering and focusing system that gathers light from a panoramic view and focuses the gathered light;

an image sensor, positioned in light-receiving relation to the panoramic light gathering and focusing system, that produces raw image data in response to light gathered and focused thereon, the raw image data having a full image resolution corresponding to the panoramic view;

a controllable data splitting circuit operable to either direct the raw image data to a first output or split the raw image data between the first output and a second output;

a master image processor, coupled to the first output of the controllable data splitting circuit, that provides a first raster output, wherein the first raster output has a maximum resolution that is less than the full image resolution of the raw image data; and a slave image processor, coupled to the second output of the controllable data splitting circuit, that provides a second raster output, wherein the second raster output has a maximum resolution that is less than the full image resolution of the raw image data;

wherein the panoramic camera is selectively operable in a plurality of modes including a first mode in which the first raster output includes a partial section of the panoramic view at a full height raster, a second mode in which the first raster output includes a full width of the panoramic view at a partial height raster, and a third mode in which the master image processor and slave image processor each output a partial width of the panoramic view at a full height raster for different portions of the panoramic view, wherein the different portions are joined to produce a full width of the panoramic view at a full height raster, wherein the master image processor activates the slave image processor and instructs the controllable data splitting circuit to split the image data between the first output and the second output only when a resolution of the image frame is to be greater than a resolution output capability of the master image processor.

16. The panoramic camera of claim 15, wherein when the panoramic camera is operated in the third mode, the slave image processor is synchronized with the master image processor.

17. The panoramic camera of claim 16, wherein the master image processor controls the slave image processor to be synchronized with the master image processor in time and in image processing parameters.

18. The panoramic camera of claim 15, wherein the panoramic camera is battery operated, wherein in the first mode battery power is conserved by using the master image processor while keeping the slave image processor in an off or very low power consumption state.

19. The panoramic camera of claim 15, wherein the second and third modes of operation each produce a three hundred and sixty degree panoramic image output.

* * * * *